(12) United States Patent  (10) Patent No.: US 7,755,872 B2
Ortega  (45) Date of Patent: Jul. 13, 2010

(54) SYSTEM, METHOD AND DEVICE TO PRESERVE PROTECTION COMMUNICATION ACTIVE DURING A BYPASS OPERATION

(75) Inventor: Juan Gaston Ortega, Guadalupe (MX)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 887 days.

(21) Appl. No.: 11/532,076

(22) Filed: Sep. 14, 2006

(65) Prior Publication Data
US 2008/0068769 A1    Mar. 20, 2008

(51) Int. Cl.
H02H 3/32    (2006.01)
(52) U.S. Cl. ........................................... 361/80
(58) Field of Classification Search .............. 361/80
See application file for complete search history.

(56) References Cited

U.S. PATENT DOCUMENTS

| | | | |
|---|---|---|---|
| 4,068,275 A * | 1/1978 | Teel et al. ............ | 361/44 |
| 4,321,645 A * | 3/1982 | Thom et al. ........... | 361/63 |
| 4,484,270 A | 11/1984 | Quernemoen | |
| 5,041,737 A | 8/1991 | Schweitzer | |
| 5,132,867 A | 7/1992 | Klancher | |
| 5,347,417 A | 9/1994 | Motoori | |
| 5,534,782 A | 7/1996 | Nourse | |
| 5,680,324 A | 10/1997 | Schweitzer | |
| 5,793,750 A | 8/1998 | Schweitzer, III et al. | |
| 5,801,937 A | 9/1998 | Gold | |
| 5,883,578 A | 3/1999 | Roberts | |
| 6,006,272 A | 12/1999 | Aravamudan | |
| 6,084,755 A | 7/2000 | Roberts | |
| 6,094,439 A | 7/2000 | Krishna | |
| 6,154,839 A | 11/2000 | Arrow | |
| 6,158,008 A | 12/2000 | Maria | |
| 6,172,432 B1 | 1/2001 | Schnackenberg | |
| 6,178,025 B1 | 1/2001 | Hardcastle | |
| 6,219,694 B1 | 4/2001 | Lazaridis | |
| 6,243,379 B1 | 6/2001 | Veerina | |
| 6,285,674 B1 | 9/2001 | Soni | |

(Continued)

FOREIGN PATENT DOCUMENTS

WO    WO 98/11767    3/1998

(Continued)

OTHER PUBLICATIONS

Barry W. Jackson, Application of a Single Pole Protection Scheme to a Double-Circuit 230 KV Transmission Line, Georgia Tech technical paper, Atlanta Georgia, May 6, 1998.

(Continued)

Primary Examiner—Stephen W Jackson
Assistant Examiner—Ann T Hoang
(74) Attorney, Agent, or Firm—Eugene M. Cummings, P.C.

(57) ABSTRACT

Provided is an intelligent electronic device for protection, monitoring, controlling, metering or automation of electrical power system. The system, method and device of the present invention preserves current differential protection active during a breaker bypass or similar operation. A current differential protection system is coordinated by one relay (transfer), which simultaneously establishes and handles multiple two-terminal 87L protection zones with several relays. This "enhanced multiple-terminal system" requires no change to protection settings on any local or remote relays during a bypass process.

44 Claims, 11 Drawing Sheets

U.S. PATENT DOCUMENTS

| | | | |
|---|---|---|---|
| 6,304,968 B1 | 10/2001 | Hacker | |
| 6,389,457 B2 | 5/2002 | Lazaridis | |
| 6,400,591 B2 | 6/2002 | Reilly | |
| 6,401,113 B2 | 6/2002 | Lazaridis | |
| 6,404,658 B1 | 6/2002 | Reilly | |
| 6,438,585 B2 | 8/2002 | Mousseau | |
| 6,438,612 B1 | 8/2002 | Ylonen | |
| 6,510,154 B1 | 1/2003 | Mayes | |
| 6,515,974 B1 | 2/2003 | Inoue | |
| 6,518,767 B1 | 2/2003 | Roberts | |
| 6,560,128 B1 | 5/2003 | Rajda | |
| 6,590,397 B2 | 7/2003 | Roberts | |
| 6,608,742 B2 | 8/2003 | Schweitzer | |
| 6,611,772 B1 | 8/2003 | Lavoie | |
| 6,630,751 B2 | 10/2003 | Curtis | |
| 6,630,752 B2 | 10/2003 | Fleming | |
| 6,639,330 B2 | 10/2003 | Villarin | |
| 6,643,701 B1 | 11/2003 | Aziz | |
| 6,654,216 B2 * | 11/2003 | Horvath et al. | 361/65 |
| 6,693,371 B2 | 2/2004 | Ziegler | |
| 6,697,361 B2 | 2/2004 | Fredette | |
| 6,751,728 B1 | 6/2004 | Gunter | |
| 6,772,347 B1 | 8/2004 | Xie | |
| 6,836,395 B2 | 12/2004 | Whitehead | |
| 6,842,780 B1 | 1/2005 | Frei | |
| 6,849,811 B1 | 2/2005 | Heflin | |
| 6,849,967 B2 | 2/2005 | Lathrop | |
| 6,850,139 B1 | 2/2005 | Dettmann | |
| 6,876,656 B2 | 4/2005 | Brewer | |
| 6,944,002 B2 | 9/2005 | Serrano | |
| 6,947,269 B2 | 9/2005 | Lee et al. | |
| 6,960,842 B2 | 11/2005 | Ziegler | |
| 7,027,896 B2 | 4/2006 | Thompson | |
| 0,067,132 A1 | 3/2007 | Tziouvaras, at al. | |
| 2002/0191576 A1 | 12/2002 | Inoue | |
| 2003/0031156 A1 | 2/2003 | Omae | |
| 2003/0069051 A1 | 4/2003 | Pretre | |
| 2003/0223167 A1 * | 12/2003 | Udren | 361/65 |
| 2004/0021995 A1 * | 2/2004 | Roberts et al. | 361/42 |
| 2004/0071080 A1 | 4/2004 | Uchiyama | |
| 2004/0098504 A1 | 5/2004 | Ueno | |
| 2004/0136356 A1 | 7/2004 | Kuo | |
| 2005/0047379 A1 * | 3/2005 | Boyden et al. | 370/338 |

FOREIGN PATENT DOCUMENTS

| | | |
|---|---|---|
| WO | WO 98/16985 | 4/1998 |
| WO | WO 99/60687 | 11/1999 |
| WO | WO 00/48287 | 8/2000 |
| WO | WO 00/54293 | 9/2000 |
| WO | WO 00/70736 A1 | 11/2000 |
| WO | WO 00/79669 A1 | 12/2000 |
| WO | WO 01/29682 | 4/2001 |
| WO | WO 01/37299 | 5/2001 |
| WO | WO 01/82447 A1 | 11/2001 |
| WO | WO 01/84521 | 11/2001 |
| WO | WO 02/11271 A2 | 2/2002 |
| WO | WO 02/11271 A3 | 2/2002 |
| WO | WO 02163744 A1 | 8/2002 |
| WO | WO 03/023799 A2 | 3/2003 |
| WO | WO 03/023799 A3 | 3/2003 |
| WO | WO 2004/040956 | 5/2004 |
| WO | WO 2005/029668 A2 | 3/2005 |
| WO | WO 2005/029668 A3 | 3/2005 |

OTHER PUBLICATIONS

Allen Risley, Electronic Security of Real-Time Protection and Scada Communications, Western Power Delivery Automation Conference, Spokane Washington, Apr. 1, 2003.

* cited by examiner

SYSTEM, METHOD AND DEVICE TO PRESERVE PROTECTION COMMUNICATION ACTIVE DURING A BYPASS OPERATION

CROSS-REFERENCE TO RELATED APPLICATIONS

None.

BACKGROUND OF THE INVENTION

The present invention generally relates to electric power systems including intelligent electronic devices (IEDs) for protecting, monitoring, controlling, metering and/or automating electric power systems and associated power lines. More specifically, the present invention relates to a system, method and device for preserving current differential protection communication active during the process involved in a breaker bypass or similar operation.

Electric utility systems or power systems are designed to generate, transmit and distribute electrical energy to loads. In order to accomplish this, power systems generally include a variety of power system elements such as electrical generators, electrical motors, power transformers, power transmission lines, buses and capacitors, to name a few. As a result, power systems must also include IEDs and procedures to protect the power system elements from abnormal conditions such as electrical short circuits, overloads, frequency excursions, voltage fluctuations, and the like.

Generally, IEDs are also used for protecting, monitoring, controlling, metering and/or automating electric power systems and associated power lines. For example, certain IEDs and procedures may act to isolate some power system element(s) from the remainder of the power system upon detection of an abnormal condition or a fault in, or related to, the power system element(s). IEDs may include protective devices such as protective relays or otherwise, remote terminal units (RTUs), power line communication devices (PLCs), bay controllers, supervisory control and data acquisition (SCADA) systems, general computer systems, meters, and any other comparable devices used for protecting, monitoring, controlling, metering and/or automating electric power systems and their associated power lines.

In one example, a particular type of IED generally known as a current differential protective relay protects an associated power line by analyzing the current at different terminals of the line. The general implementation of a current differential protective relay is illustrated in FIG. 1A. A current differential protective relay $R_1$ measures the current $I_1$ situated at one bus 102 via current transformer CT1 on an associated power line 108. Another protective relay $R_2$ measures the current $I_2$ situated at another bus 104 via current transformer CT2 on the same power line 108. The current vector quantity $I_2$ (magnitude and angle) measured by protective relay $R_2$ is transmitted to the current differential protective relay $R_1$ via communication link 130.

During operation, the current differential protective relay $R_1$ then calculates a vector sum of the currents $[\Sigma(I_1, I_2)]$. Under no-fault conditions, the resulting vector sum equals about zero amperes. In contrast, the occurrence of a fault or other abnormal condition is detected when the resulting vector sum does not equal about zero amperes. Upon detection of a fault or abnormal condition, the current differential protective relay $R_1$ sends a trip signal or command to an associated circuit breaker 110 to isolate the condition.

In order to fully isolate the fault condition, it is to be noted that the other protective relay $R_2$ is also a current differential protective relay. In this arrangement, the other current differential protective relay $R_2$ may be adapted to concurrently receive the current measurement $I_1$ from current differential protective relay $R_1$ via communication link 130 and calculate a vector sum therefrom.

When protecting, monitoring, controlling, metering and/or automating electric power systems and associated power lines, it is often beneficial to reroute data streams such as communication signals therein in order to calculate maintenance on protective devices or on power system elements associated thereto. For example, a power system element may require maintenance wherein the power system element and its associated protective device must be isolated from its associated power line. In order to maintain power distribution through the power line, power may be rerouted around the element that requires maintenance. In order to maintain protection, control, monitoring etc. of the power line, data streams such as communication signals must also be rerouted.

U.S. Pat. No. 6,639,330 for a "Transfer Relay for Computer Base Equipment" describes a power switching transfer relay to automatically switch an electrical load, such as that drawn by a computer or other sensitive electrical or electronic equipment, from a primary power source to a secondary, or backup, power source upon interruption or loss of the primary source. The transfer relay includes a power relay and two control relays that are arranged to switch the electrical power input from the primary source to the backup source upon failure of the primary power source in the space of less than one cycle, and to actuate an alarm upon loss of the primary power source, loss of the backup power source, or the occurrence of a relay fault.

U.S. Pat. No. 5,347,417 for a "Power Supply Protection System Applied to Optical Subscriber Network" describes a system for protecting a remote power supply for supplying power to an optical subscriber network, via a pair of power supply lines, from a remote power supply apparatus, with the power supply branch apparatuses inserted into the power supply lines in correspondence with each power receiving circuit respectively mounted in subscriber transmission nodes. Each of the power supply branch apparatuses comprises relay contacts inserted into its own power supply branch lines connected between the power supply lines and its own power receiving circuit, and a relay energized by an overcurrent detector or first and second communication units to change over the relay contacts. The relay contacts are opened and closed subscriber by subscriber sequentially to detect a faulty portion, and thereafter, the power is fed again selectively to the subscribers which have not experienced the fault.

U.S. Pat. No. 5,132,867, for a "Method and Apparatus for Transfer Bus Protection of Plural Feeder Lines" describes a microprocessor based tie relay for controlling a tie circuit breaker between a main bus and a transfer bus to which any one of a number of feeder lines may be connected through a disconnect switch when the feeder circuit breaker associated with that feeder line is out of service. Settings for the protection characteristics of each of the feeder relays controlling the feeder circuit breakers are stored in non-volatile memory together with a default protection characteristic suitable for protecting any of the feeder lines. The appropriate protection characteristic for the feeder line connected to the transfer bus is selected for use by the tie relay in controlling the tie circuit breaker. This selection may be made manually by an operator, or preferably automatically by the microprocessor of the tie relay which monitors the states of the feeder circuit breakers and of the disconnect switches and selects the settings associated with the feeder line whose feeder circuit breaker is open and disconnect switch is closed. If the microprocessor does not recognize only one feeder line connected to the transfer bus, the default protection characteristic is selected and an alarm is generated.

U.S. Pat. No. 5,041,737 for a "Programmable Bus-Tie Relay having a Plurality of Selectable Setting Groups" describes a bus-tie relay apparatus which includes a multi-position mechanical switch and a logic circuit responsive to the position of the mechanical switch for producing digital signals on five digital line, wherein a valid digital signal comprises the presence of high conditions on two, and two only, of said digital lines. A sensor senses the condition of the digital lines and retrieves the values of a relay element setting group from memory associated with that digital signal. A plurality of such relay element setting groups are stored in the apparatus, each one of which comprises values corresponding to the characteristics of an in-place relay associated with a particular one power line in a group thereof.

FIG. 1B generally provides an illustration of a traditional system for applying IEDs, such as protective devices, in order to maintain protection, monitoring, controlling, metering and/or automating of an associated power line. It should be clear that while FIG. 1B and other figures (including those illustrating the embodiments of the present invention) show two power lines emanating from a single substation, the methods and systems described herein may be generally extended to more or less than two lines, delivered to one or more substations. In the described systems, local protective relays $R_1$, $R_{n-1}$ are associated with respective circuit breakers 110, 111 for primary protection. For primary protection, local protective relays $R_1$, $R_{n-1}$ are current differential protective relays similar to those described with respect to FIG. 1A.

In the arrangement of FIG. 1B, local protective relays $R_1$, $R_{n-1}$ receive current measurements $I_2$, $I_n$ from remote protective relays $R_2$, $R_n$ via communication link 130b, 130a in order to preserve current differential protection on power lines 108, 109 as discussed with respect to FIG. 1A. Upon detection of a fault or abnormal condition on power lines 108, 109, the local protective relay $R_1$, $R_{n-1}$ associated with that particular power line 108, 109 signals a corresponding circuit breaker 110, 111 to isolate the condition. In order to fully isolate the fault condition, it is to be noted that remote protective relays $R_2$, $R_n$ are also current differential protective relays.

Circuit breakers (e.g., 110 and 111) are high maintenance devices that experience some wear each time they interrupt a fault condition. Accordingly, a substation is typically constructed such that each primary circuit breaker 110, 111 may be taken out of service for maintenance purposes or replacement while leaving its associated power line 108, 109 associated therewith energized. In these instances, prior art arrangements have isolated the primary circuit breaker 110, 111 along with its associated local protective relay $R_1$, $R_{n-1}$ in order to provide for secondary protection on the energized power line 108, 109. The local protective relay $R_1$, $R_{n-1}$ associated with the primary circuit breaker 110, 111 is commonly referred to as the primary relay.

A method for isolating a primary circuit breaker such as 110 or 111 while providing secondary protection in such instances is commonly referred to as a breaker bypass operation. As shown in FIG. 1B, one traditional arrangement for providing secondary protection in such instances includes having a transfer bus 106 associated with a main or primary bus 102. In this arrangement, to isolate or take primary circuit breakers 110, 111 out of service, all other lines are typically connected to the main bus 102 by proper configuration of switches $S_2$, $S_5$, and other switches as illustrated.

For example, all other power lines are connected to the main bus 102 by closing switch $S_2$, and opening switch $S_5$. During a breaker bypass operation, switch $S_5$, is closed, whereas switches $S_1$, $S_2$, are opened such that power lines 108, 109 are now connected to transfer bus 106. Accordingly, current differential protection of either power line 108, 109 is now maintained through protective relay $R_x$ and circuit breaker 114. The circuit breaker 114 which provides secondary protection is commonly referred to as a transfer breaker, tie breaker, or coupler breaker, whereas its associated relay $R_x$ is commonly referred to as a transfer breaker, tie breaker, or coupler relay. Communication (e.g., communication of current vector quantities as discussed above) between remote relays $R_2$, $R_n$ and transfer relay $R_x$ may be optionally routed through communications switch 200.

Nevertheless, the arrangement of FIG. 1B poses a number of challenges for current differential protection of power lines. For example, current differential protection generally cannot be maintained during the entire bypass process due to the resulting parallel lines that feed a protected power line through both the main and transfer buses during the switching process of a breaker bypass operation. The hypothetical condition of keeping line current differential protection active on the local and remote relays during the switching process, would inaccurately cause these relays to detect a fault or abnormal condition on the power line. This is because the switching process of a bypass operation on the aforementioned bus arrangement, creates a parallel feed path onto the bus, changing the local measured quantity, which causes the vector sums of the currents to be unequal to zero on each relay.

In order to overcome this shortcoming, during a breaker bypass or similar operation, current differential protection is often disconnected and replaced by backup protection such as step-distance. This, however, compromises the quality of the power line protection as step-distance protection is generally known to be slower and less reliable than current differential protection. Most faults associated with a breaker bypass operation generally occur due to human error. For example, operators may inadvertently cause a bus-to-ground fault while they intend to create a parallel current path that will allow for isolation of the circuit breaker. Therefore, during manual modifications to the bus configurations during a bypass operation, the risk of causing a fault is the highest.

Accordingly, it is an object of the invention to provide a system and method for maintaining current differential protection of a power line even during a breaker bypass operation.

This and other desired benefits of the preferred embodiments, including combinations of features thereof, of the invention will become apparent from the following description. It will be understood, however, that a process or arrangement could still appropriate the claimed invention without accomplishing each and every one of these desired benefits, including those gleaned from the following description. The appended claims, not these desired benefits, define the subject matter of the invention. Any and all benefits are derived from the multiple embodiments of the invention, not necessarily the invention in general.

SUMMARY OF THE INVENTION

In accordance with the invention, an intelligent electronic device for protection, monitoring, controlling, metering or automation of power lines in an electrical power system is provided. The system, method, and devices of the present invention are adapted to provide protection of a power system. In other embodiments, a system, method, and device are provided which preserve line current differential protection during a breaker bypass or a similar operation.

In one embodiment, a system is provided for maintaining current differential protection of a power line using a plurality of IEDs. The system generally includes a local IED associated with a location of the power line. The local IED is adapted to measure and transmit the current vector quantity associated with the location of the local IED. A remote IED associated with a location of the power line is further provided, wherein the remote IED is adapted to measure and transmit the current vector quantity associated with the location of the remote IED.

A transfer IED in communication with the local and remote IEDs is adapted to receive the currents vector quantities transmitted by the local and remote IEDs.

The transfer IED is further associated with a second location on the same bus arrangement as the local IED interconnected with the protected power line. This second location may be on a power line which is parallel to the power line of the local and remote relays. The transfer IED calculates the sum of the currents associated with its own location in the bus and the currents received from the local and remote IEDs. When the sum of the currents is not equal to about zero amperes, the transfer IED transmits a signal to cause tripping of a circuit breaker associated therewith, thereby isolating the protected power line.

In accordance with yet another embodiment of the invention, the transfer IED is further adapted to transmit the current measured by the transfer IED and the current measured by the remote IED to the local IED. In turn, the local IED is adapted to receive the current quantity sent by the transfer IED, which is the vector sum of the currents measured by the transfer and the remote IED. The local IED will utilize the received current quantity and its own current measurement to evaluate a whether to assert a tripping signal to the associated local circuit breaker, in case these quantities do not add up to zero amperes.

In accordance with yet another embodiment of the invention, the transfer current differential IED is further adapted to transmit the current measured by the transfer IED and the current measured by the local IED to the remote IED. In turn, the remote IED is adapted to receive the current quantity sent by the transfer IED, which is the vector sum of the currents measured by the transfer and the local IED. The remote IED will utilize the received current quantity and its own current measurement to evaluate whether to assert a tripping signal to the associated remote circuit breaker, in case these quantities do not add up to zero amperes.

In accordance with yet another embodiment of the present invention, each of the transfer, local and remote IEDs are current differential IEDs which preserve line current differential protection during a breaker bypass or a similar operation.

In yet another embodiment of the present invention, a method for maintaining current differential protection of a power line in a power system is provided including the steps of measuring the current associated with a location of the power line; measuring the current associated with another location of the power line; measuring the current associated with a location of second power line interconnected with first power line; calculating the sum of the currents associated the locations of the first and second power lines; and transmitting a signal to a circuit breaker associated with the second power line when the sum of the currents is not equal to about zero amperes.

In yet another embodiment of the present invention a method for maintaining current differential protection of a power line in a power system is provided including the steps of measuring the current associated with a location of the power line; measuring the current associated with another location of the power line; measuring the current associated with a location of second power line interconnected with first power line; calculating the sum of the current associated with the first location of the first power line and current associated with the location of the second transmission associated the locations of the first and second power lines; and transmitting a signal to a circuit breaker associated with the second location of the second power line when the sum of the currents is not equal to about the current associated with the second location of the second power line.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE INVENTION

The present invention generally relates to a method and apparatus for customization of an IED. Generally, IEDs are used for protecting, monitoring, controlling, metering and/or automating electric power systems and associated power lines. IEDs may include protective devices such as protective relays, or otherwise, RTUs, PLCs, bay controllers, SCADA systems, general computer systems, meters, and any other comparable devices used for protecting, monitoring, controlling, metering and/or automating electric power systems and their associated power lines.

Although the embodiments described herein are preferably associated with protective devices, such as protective relays including transfer relays, local relays and remote relays, it is contemplated that the embodiments may also be associated with any suitable power system control or protective devices such as those mentioned or described above or below.

Figure 2A:
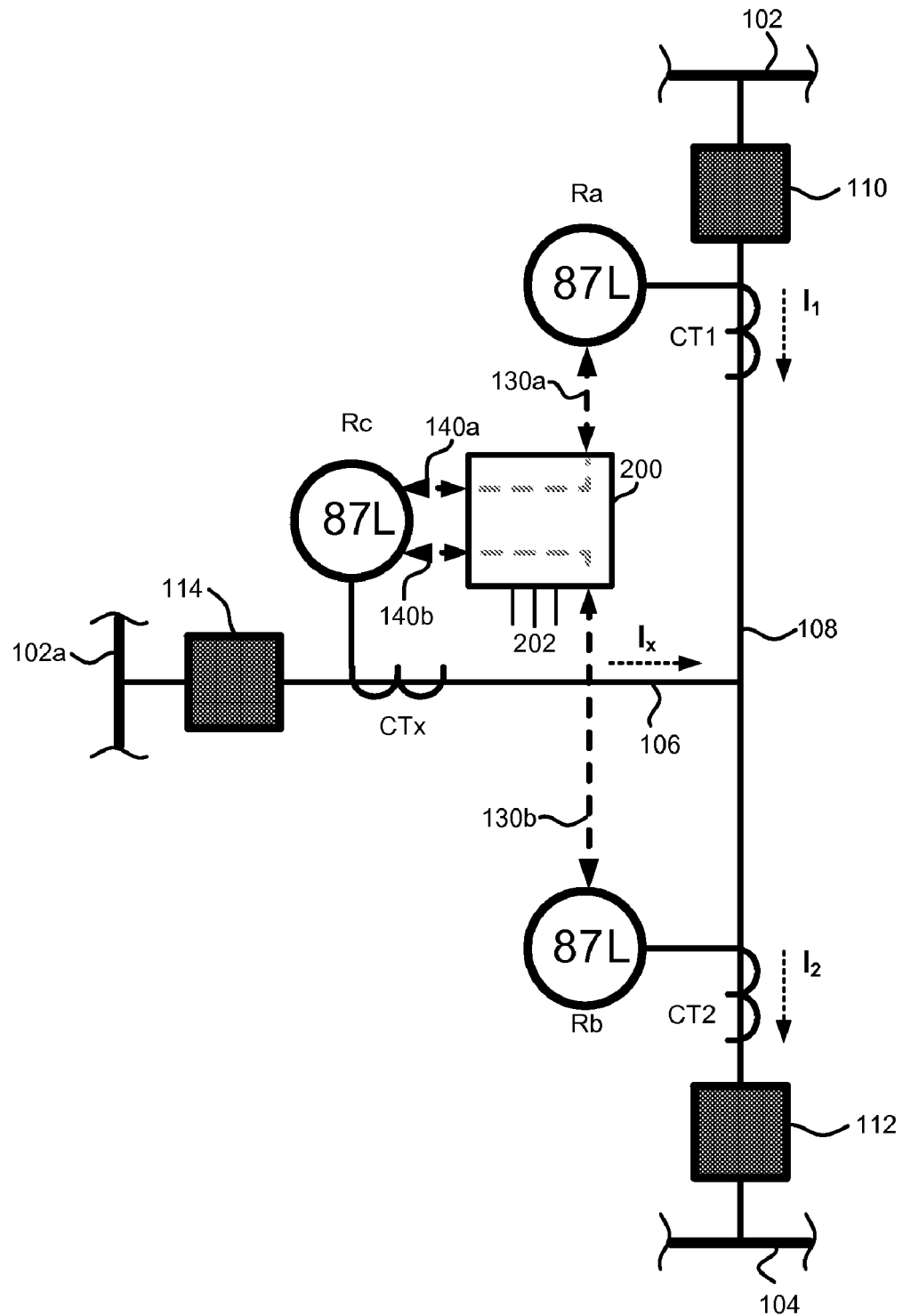
FIG. 2A is a single line schematic diagram of a system for providing protection during a bypass or similar operation for a power line having two IEDs associated therewith in accordance with an embodiment of the present invention.

FIG. 2A illustrates an embodiment of the invention for providing protection during a circuit breaker 110 bypass or similar operation using a transfer relay $R_c$ to simultaneously establish and coordinate a three-terminal protection with a local relay $R_a$ and a remote relay $R_b$, which communicate with the transfer relay $R_c$ on a two-terminal protection mode.

During primary protection of power line 108, local current differential protective relay $R_a$ measures the current $I_1$ situated at one bus 102 via current transformer CT1 on an associated power line 108. Another remote protective relay $R_b$ measures the current $I_2$ situated at another bus 104 via current transformer CT2 on an associated power line 108. Current $I_2$ measured by remote relay $R_b$ is transmitted to local relay $R_a$ via communication link 130.

The communication link 130 may be a wired link such as a fiber optic, regular metallic, Ethernet copper wired or a wireless link such as digital radio, RF or microwave communication. Current $I_2$ may be further communicated on the communication link 130 as time-aligned vector (magnitude and phase angle) quantities. A secured communication may further be achieved by using known encryption technologies such as data encryption standard (DES), triple DES (3DES), advanced encryption standard (AES), Rivest Cipher (RC4). The current $I_2$ may be further communicated on the communication link 130 as time-aligned vector quantities.

For purposes of this embodiment, communication among protective devices may be generally achieved by a bidirectional communications means. For example, data streams or communication signals maybe transferred as described in U.S. Pat. No. 5,793,750 for "System for Communicating Output Function Status Indications Between Two or More Power System Protective Relays" and U.S. Pat. No. 6,947,269 for "Relay-to-Relay Direct Communication System in an Electric Power System."

During protection of a two-terminal line, the local relay $R_a$ combines the current $I_1$ that it measures with current $I_2$ measured and communicated by the remote relay $R_b$. The local relay $R_a$ calculates a vector sum of the currents ($\Sigma(I_1, I_2)$). Under normal conditions, the resulting vector sum equals about zero amperes. In contrast, the occurrence of a fault or other abnormal condition is detected when the resulting vector sum does not equal about zero amperes. Upon detection of a fault or abnormal condition, local relay $R_a$ sends a trip signal to an associated circuit breaker 110 to isolate the condition.

Figure 1A:
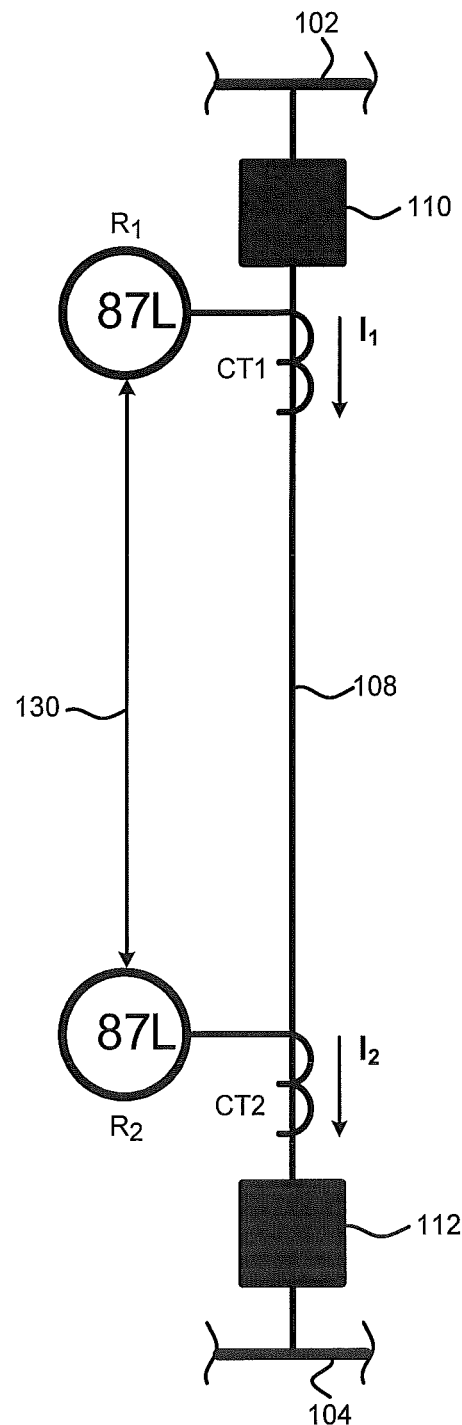
FIG. 1A is a single line schematic diagram of a prior art system for current differential protection of a power line.
Figure 1B:
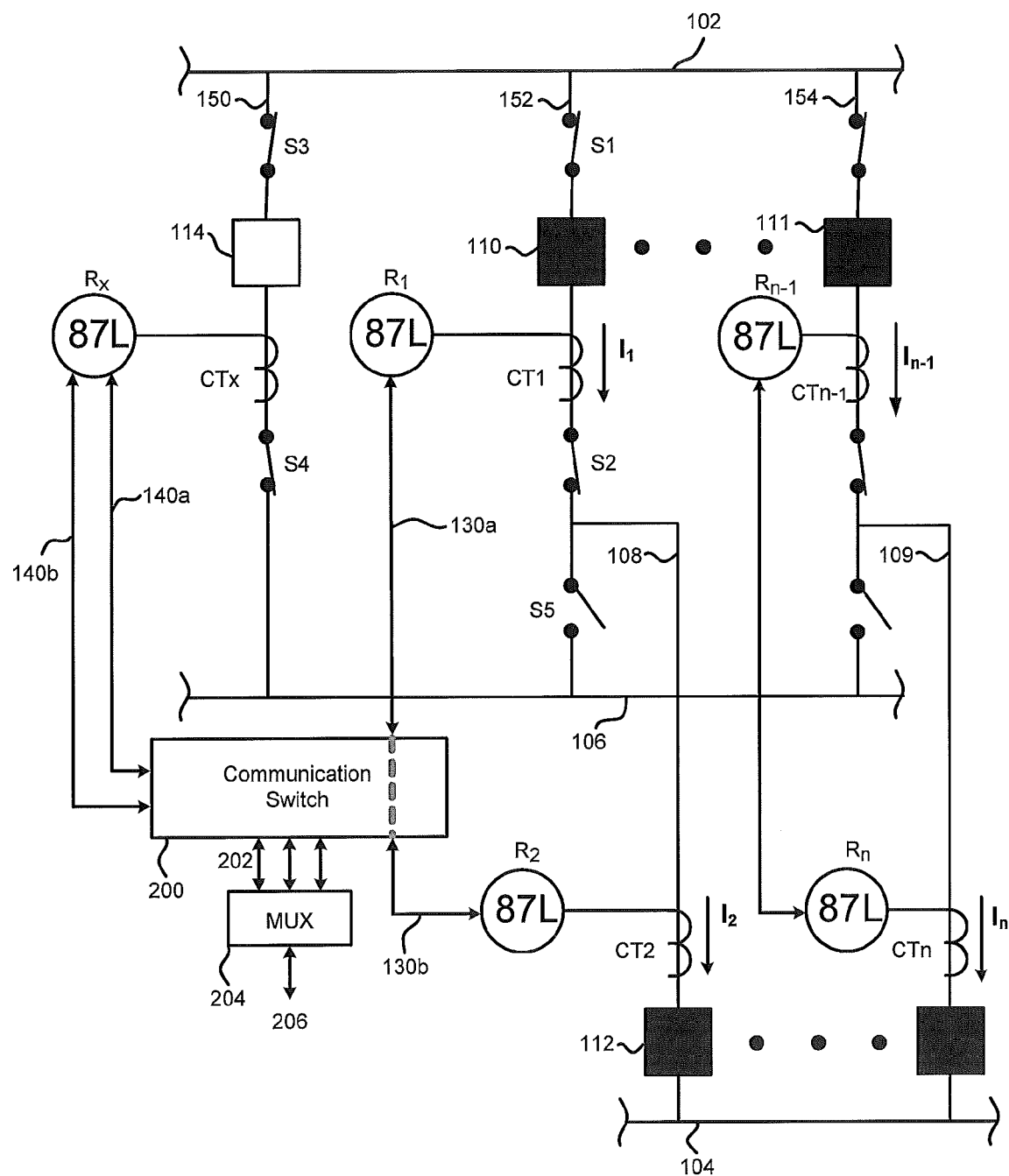
FIG. 1B is a single line schematic diagram of a prior art system for providing a bypass or similar operation for a power line.

The bus arrangement containing circuit breaker 110 is designed such that it may take circuit breaker 110 out of service for maintenance purposes or replacement while leaving its associated power line 108 therewith energized and protected by a transfer relay $R_c$. For example, during a bypass or similar operation, circuit breaker 110 may be isolated. However, unlike traditional bypass arrangements (e.g., as described with respect to FIG. 1B), communication to and from local relay $R_a$ is not terminated, but rather rerouted to transfer relay $R_c$. More specifically, protection is established by communication between the transfer relay $R_c$ and each of the local relay $R_a$ and the remote relay $R_b$.

In an embodiment, in order to initiate a bypass or similar operation, an operator may signal to communication switch 200 to reroute communications. For example, the operator may initiate such via control inputs 202. More specifically, an operator may signal to communication switch 200 to cease communication between the local relay $R_a$ and the remote relay $R_b$ and, instead, commence communication between the transfer relay $R_c$ with each of the local relay $R_a$ and the remote relay $R_b$. An example of a communications switch that may be used for this application is that described in U.S. Patent Application No. 60/718,365 for a Method and Apparatus for Routing Data Streams Among Intelligent Electronic Devices or the SEL 2126 Fiber Optic Transfer Switch manufactured by Schweitzer Engineering Laboratories, Inc., both of which are incorporated herein in their entirety and for all purposes.

In this new configuration, transfer relay $R_c$ is configured to receive currents quantities $I_1$, $I_2$ respectively measured by local and remote relays $R_a$, $R_b$. The transfer relay $R_c$ is further adapted to measure transfer current $I_x$. With these values, transfer relay $R_c$ calculates a vector sum of the transfer current $I_x$ and the currents $I_1$, $I_2$ respectively transmitted by local and remote relays $R_a$, $R_b$ [$\Sigma(I_1, I_2, I_x)$]. Under normal conditions, the resulting vector sum equals approximately zero amperes. It shall be noted that this is the case because under normal conditions, I $I_2$ I generally equals to I $\Sigma(I_1, I_x)$ I. In contrast, the occurrence of a fault or other abnormal condition is detected when the resulting vector sum does not equal zero amperes. Upon detection of a fault or abnormal condition, the transfer relay $R_c$ sends a trip signal to an associated circuit breaker 114 to isolate the condition.

Figure 2B:
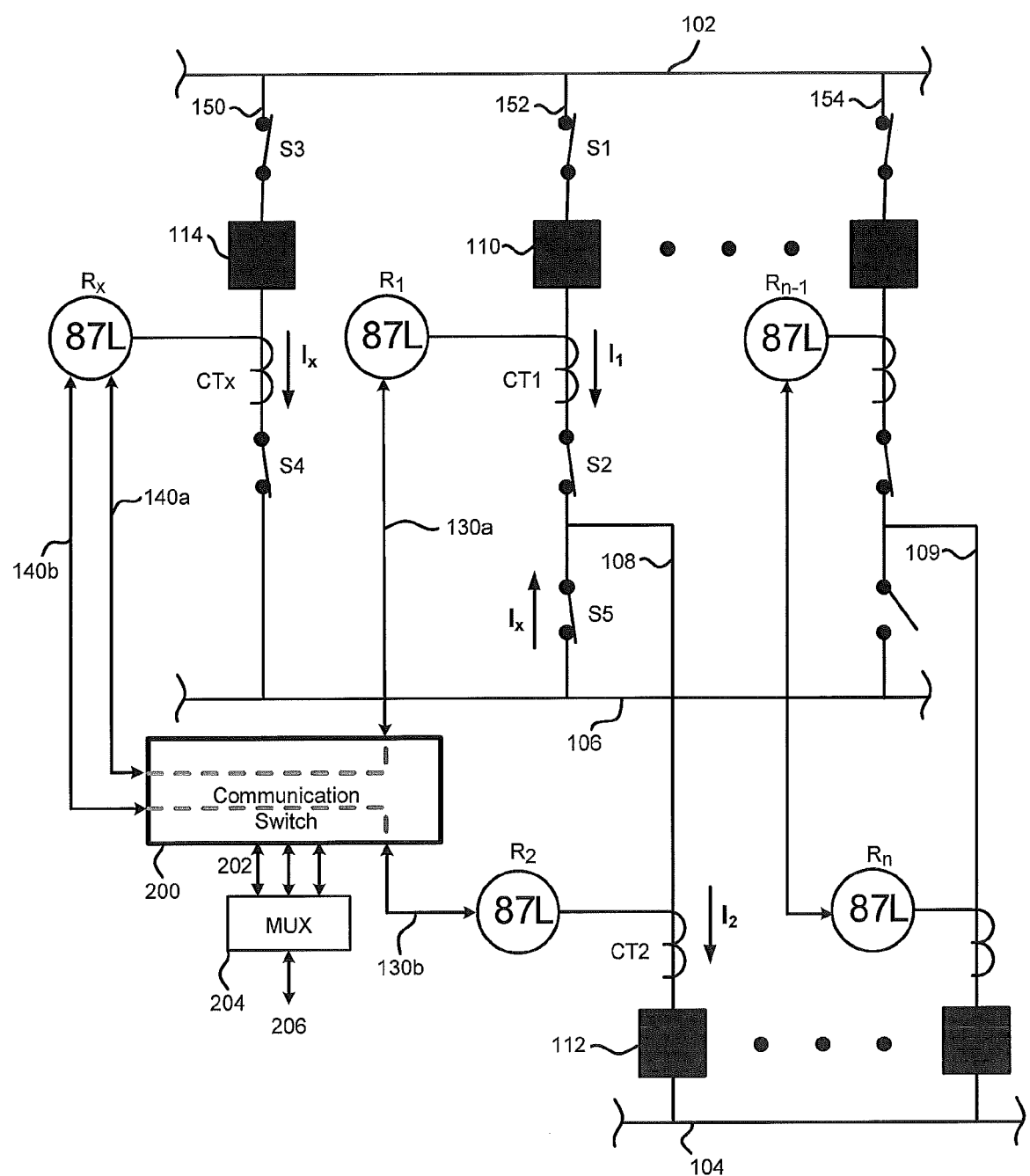
FIG. 2B is a single line schematic diagram of a system for maintaining current differential protection during a bypass or similar operation for a power line having a plurality of IEDs associated therewith in accordance with an embodiment of the present invention.

FIG. 2B illustrates an embodiment of the invention for preserving current differential protection active during a circuit breaker bypass or similar operation using a transfer relay $R_x$ to establish a multiple feed line terminal. The embodiment of FIG. 2B differs from the embodiment of FIG. 2A in that all of transfer relay $R_x$, local relay $R_1$, and remote relay $R_2$ are current differential relays.

Like the arrangement of FIG. 2B, the bus arrangement containing circuit breaker 110 is designed such that it may take circuit breaker 110 out of service for maintenance purposes or replacement while leaving its associated power line 108 therewith energized and protected by a transfer current differential relay $R_x$. For example, during a bypass or similar operation, circuit breaker 110 may be isolated. However, unlike traditional bypass arrangements, communication to and from local current differential relay $R_1$ is not isolated, but rather rerouted to transfer current differential relay $R_x$ in accordance with an aspect of the present invention. More specifically, current differential protection is maintained by establishing communication between the transfer current differential relay $R_x$ and each of the local current differential relay $R_1$ and the remote current differential relay $R_2$.

In one embodiment, in order to initiate a bypass or similar operation, an operator may close switch S5. The operator further signals to communication switch 200 to reroute communications via control inputs 202. More specifically, an operator may signal to communication switch 200 to cease communication between the local current differential relay $R_1$ and the remote current differential relay $R_2$ and, instead, commence communication between the transfer current differential relay $R_x$ with each of the local current differential relay $R_1$ and the remote current differential relay $R_2$.

In one embodiment, the control inputs 202 may be optionally controlled by a multiplexer (or MUX) 204. It is to be noted that the communications switch 200 and the MUX 204 are included to reduce the number of communications channels involved and for automation purposes. In another embodiment (not shown), the communication between the transfer current differential relay $R_x$ with each of the local current differential relay $R_1$ and the remote current differential relay $R_2$ may be initiated by directly linking each of the local current differential relay $R_1$ and the remote current differential relay $R_2$ to transfer current differential relay $R_x$ without a communications switch or a MUX.

Referring back to FIG. 2B, in the depicted configuration, communication between the transfer current differential relay $R_x$ with each of the local current differential relay $R_1$ and the remote current differential relay $R_2$ establishes a bypass or similar operation. Transfer current differential relay $R_x$ is configured to receive currents $I_1$, $I_2$ respectively measured by local and remote current differential relays $R_1$, $R_2$. The transfer current differential relay $R_x$ is further adapted to measure transfer current $I_x$. Transfer current differential relay $R_x$ calculates a vector sum of the transfer current and the currents received from local current differential relay $R_1$ and remote current differential relay $R_1$ [$\Sigma(I_1, I_2, I_x)$]. Under normal conditions, the resulting vector sum equals about zero amperes. It shall be noted that this is the case because under normal conditions, I $I_2$ I generally equals to I $\Sigma(I_1, I_x)$ I. In contrast, the occurrence of a fault or other abnormal condition is detected when the resulting vector sum does not equal about zero amperes.

Simultaneously, transfer current differential relay $R_x$ further calculates a vector sum of the currents $\Sigma(I_2, I_x)$ and $\Sigma(I_1, I_x)$ and communicates these vector sums back to local current differential relay $R_1$ and remote current differential relay $R_2$, respectively through corresponding communications links 130b, 140b and 130a, 140a. Local current differential relay $R_1$ calculates a vector sum of the current measured $I_1$ and the vector sum $\Sigma(I_2, I_x)$ received from transfer current differential relay $R_x$ ($\Sigma(I_1, I_2, I_x)$). Under normal conditions, the resulting vector sum equals about zero amperes. In contrast, the occurrence of a fault or other abnormal condition is detected when the resulting vector sum does not equal about zero amperes.

Remote current differential relay $R_2$ calculates a vector sum of the current measured $I_2$ and the vector sum $\Sigma(I_1, I_x)$ received from transfer current differential relay $R_x$ ($\Sigma(I_2, I_1, I_x)$). Under normal conditions, the resulting vector sum equals about zero amperes. In contrast, the occurrence of a fault or other abnormal condition is detected when the resulting vector sum does not equal about zero amperes. Upon detection of a fault or abnormal condition, the associated relay $R_1$, $R_2$, or $R_x$ sends a trip signal to an associated circuit breaker 110, or 114 to isolate the condition. In this way, the tripping of circuit breaker 110 and 114 fully isolates a fault associated power line 108 and the parallel power line 106. It is to be noted that additional relays $R_{n-1}$, $R_n$, breakers, and communications links (not shown) may further be added and provided protection in accordance with the teachings above.

The main advantage of the invention, which is built into the transfer current differential relay (e.g., $R_x$), is the high system reliability achieved by preserving current differential protection during the entire process of a bypass operation. In addition, when setting up a multiple-terminal line system, the transfer current differential relay (e.g., $R_x$) in accordance with the teachings of the present invention will not require any connected IEDs to adjust its settings to communicate using any special mode other than the standard two-terminal current differential mode. This is important because the actual implementation requires less communications channels and less commissioning time, because no IED settings are required to be controlled remotely on the local or remote relays (e.g., $R_1$, $R_2$).

In yet another embodiment, communication links 140a and 140b may be combined into a single communication link. In such an embodiment, a multiplexer (MUX) may replace the communications switch 200 in order to simplify communication traffic from the plurality of communication links 140a, 140b into a single channel communication link. Examples of MUXs known in the art that may be used herein include the Focus MUX manufactured by Pulsar Technologies, Inc., the Jungle MUX manufactured by General Electric Company, and the IMUX manufactured by RFL Electronics Inc.

Figure 3A:
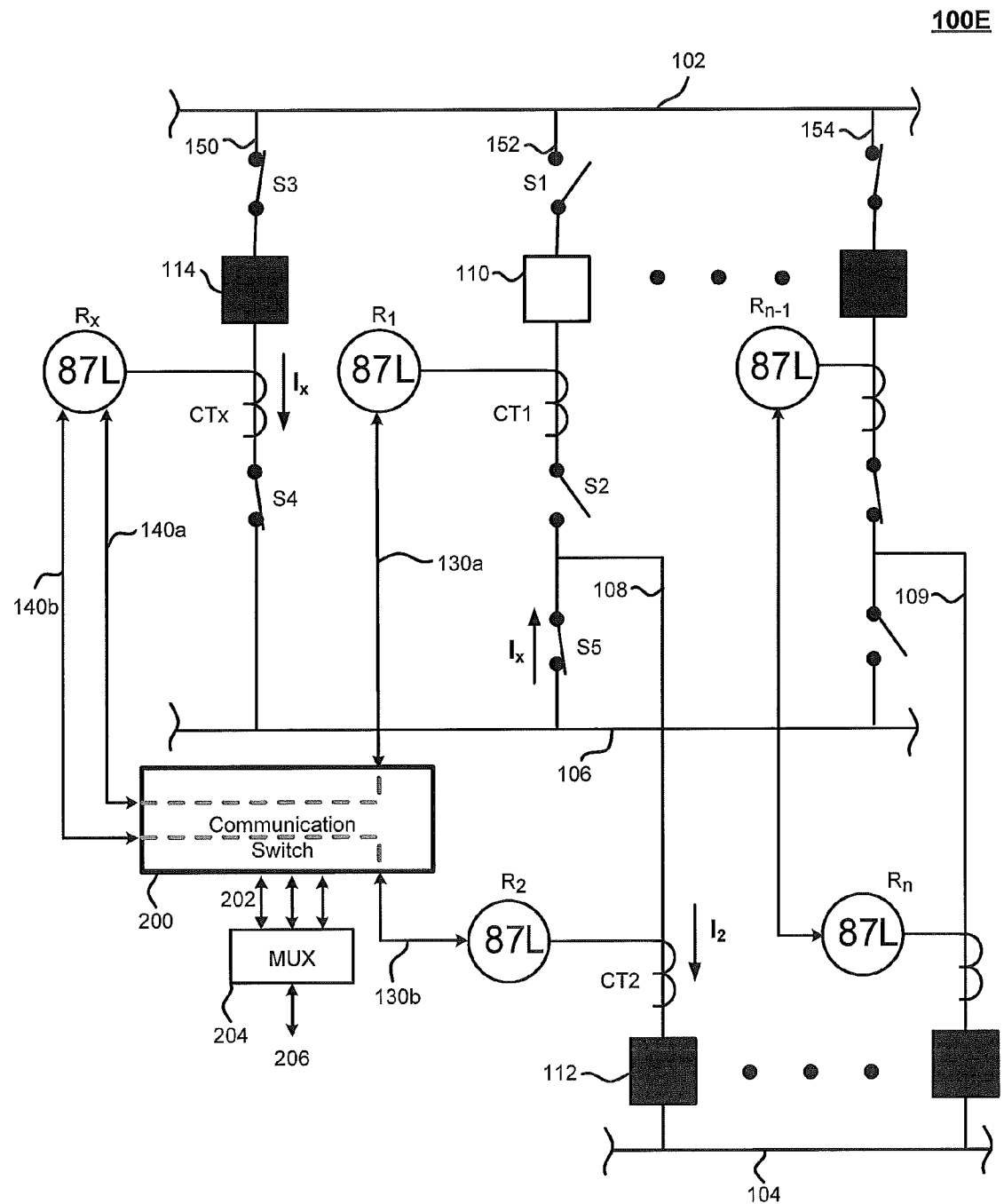
FIG. 3A is a single line schematic diagram of the system for maintaining current differential protection during a bypass or similar operation of FIG. 2B, wherein the breaker bypass operation is consummated.

FIG. 3A illustrates an embodiment of the invention for consummating circuit breaker bypass operation after preserving current differential protection active during a circuit breaker bypass or similar operation using a transfer current differential relay $R_x$ to establish a multiple feed line terminal as illustrated in FIG. 2B.

After rerouting the communications among the current differential relays $R_x$, $R_1$, $R_2$ in accordance with the bypass operation as illustrated in FIG. 2B, the local circuit breaker 110 may be safely isolated by opening switch S1 and S2. Because of the rerouting of communications as discussed with respect to FIG. 2B, current differential protection is maintained for power line 108 and power line 109. Also, during normal conditions, the current values $I_x$, $I_2$ respectively measured by transfer current differential relay $R_x$ and remote current differential relay $R_2$ are approximately equal upon a successful bypass or similar operation.

In order to restore local breaker 110 or place local feed line 152 back to service, the process reverses by closing local breaker 110 and the switches S1, S2 associated therewith.

In order to ensure proper restoration of the local breaker, transfer current differential relay $R_x$ calculates a vector sum of the transfer current and the currents received from local current differential relay $R_1$ and remote current differential relay $R_1$ [$\Sigma(I_1, I_2, I_x)$]. Under normal conditions, the resulting vector sum equals about zero amperes. In contrast, if the local breaker is improperly restored or if there is an abnormal condition thereof, the resulting vector sum does not equal about zero Simultaneously, transfer current differential relay $R_x$ further calculates a vector sum of the currents $\Sigma(I_2, I_x)$ and $\Sigma(I_1, I_x)$ and communicates these vector sums back to local current differential relay $R_1$ and remote current differential relay $R_2$, respectively through corresponding communications links 130b, 140b and 130a, 140a. Local current differential relay $R_1$ calculates a vector sum of the current measured $I_1$ and the vector sum $\Sigma(I_2, I_x)$ received from transfer current differential relay $R_x$ ($\Sigma(I_1, I_2, I_x)$). Under normal conditions, the resulting vector sum equals about zero amperes. In contrast, if the local breaker is improperly restored or if there is an abnormal condition thereof, the resulting vector sum does not equal about zero Remote current differential relay $R_2$ calculates a vector sum of the current measured $I_2$ and the vector sum $\Sigma(I_1, I_x)$ received from transfer current differential relay $R_x$ ($\Sigma(I_2, I_1, I_x)$). Under normal conditions, the resulting vector sum equals about zero amperes. In contrast, if the local breaker is improperly restored or if there is an abnormal condition thereof, the resulting vector sum does not equal about zero If a fault or abnormal condition is not detected, a restoration operation is initiated to open transfer switch S5 while closing switches S1 and S2 associated with the previously bypassed circuit breaker 110. In contrast, if a fault or abnormal condition is detected, the associated current differential relay $R_1$, $R_2$, or $R_x$ will communicate a trip signal to open its associated circuit breakers 110, 111, or 114.

The transfer current differential relay $R_x$ may further be adapted to coordinate with communication switch 200 to disconnect communication links between 130a and 140a, and between 130b and 140b. Moreover, transfer current differential relay $R_x$ may further be adapted to re-establish links between communication link 130a and 130b. As such, the transfer bus 106 is freed up to service another local feed line such as local feed line 154 in the system through the communication switch 200 using the system and method of the present invention or any other bypass means.

Figure 3B:
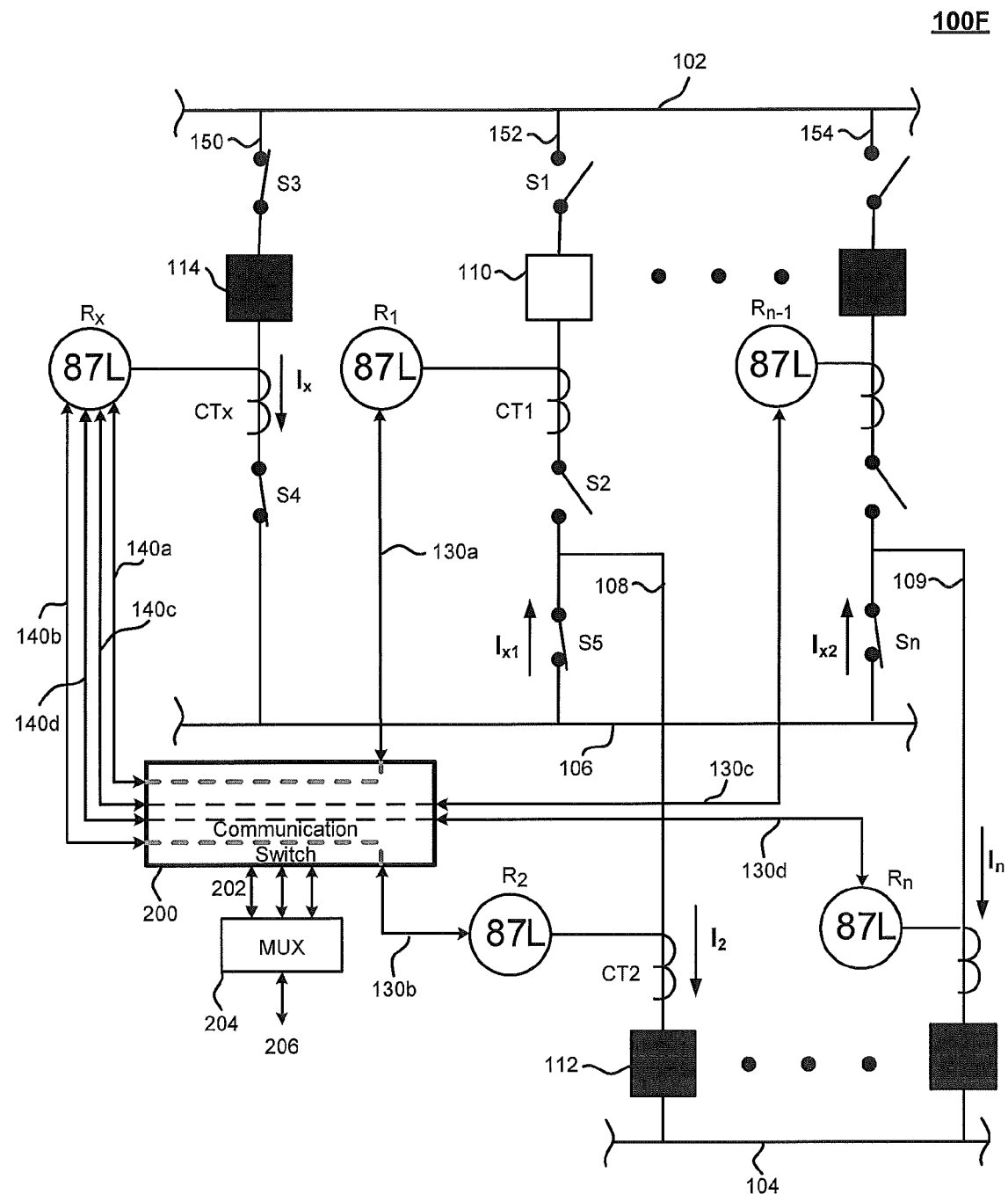
FIG. 3B is a single line schematic diagram of the system for maintaining current differential protection during a bypass or similar operation of FIG. 3A, wherein the communication switch is adapted to include coordinate the communication with other associated IEDs in accordance with an embodiment of the present invention.

As illustrated in FIG. 3B, in accordance with yet another aspect of the present invention, the transfer current differential relay $R_x$ may further be adapted to communicate with local current differential relay $R_{n-1}$ and remote current differential relay $R_n$ in order to provide current differential protection during a bypass or similar operation using similar principles as discussed in greater detail with respect to FIG. 2B and 3A. In yet another embodiment of FIG. 3B, communication links 140a, 140b, 140c and 140d may be combined into a single communication link. In such an embodiment, a multiplexer (MUX) may replace the communications switch 200 in order to simplify communication traffic from the plurality of communication links 140a, 140b, 140c, 140d into a single channel communication link.

Figure 3C:
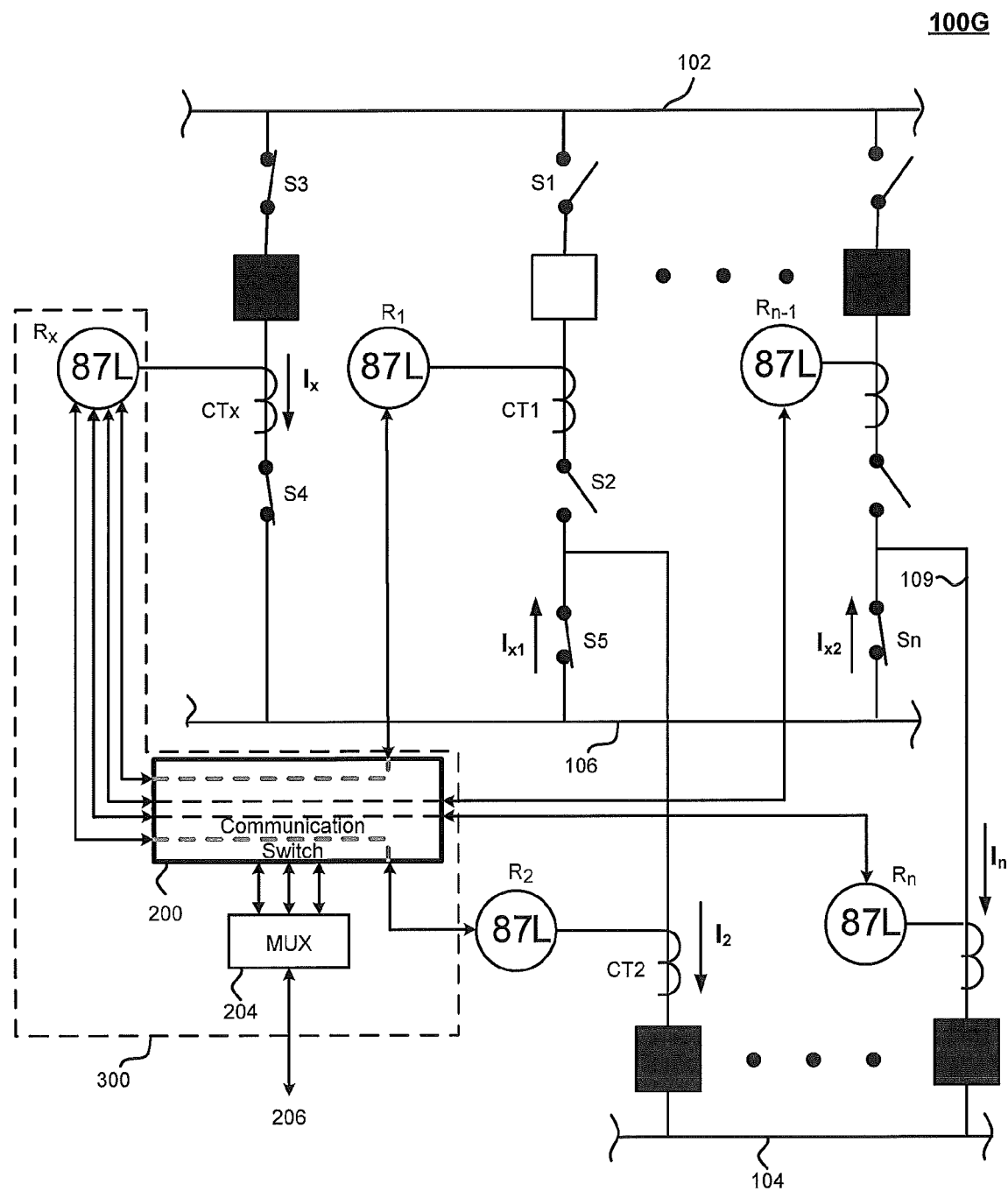
FIG. 3C is a single line schematic diagram of the system for maintaining current differential protection during a bypass or similar operation of FIG. 3A, wherein the transfer relay includes a communication switch and a MUX in a single device in accordance with an embodiment of the present invention.

As illustrated in FIG. 3C, in accordance with yet another aspect of the present invention, the transfer current differential relay $R_x$ may further be adapted to include both transfer relay capability with that of a communication switch 200 in a single device 300. The single device 300 may further optionally include a MUX 204 therein.

Figure 3D:
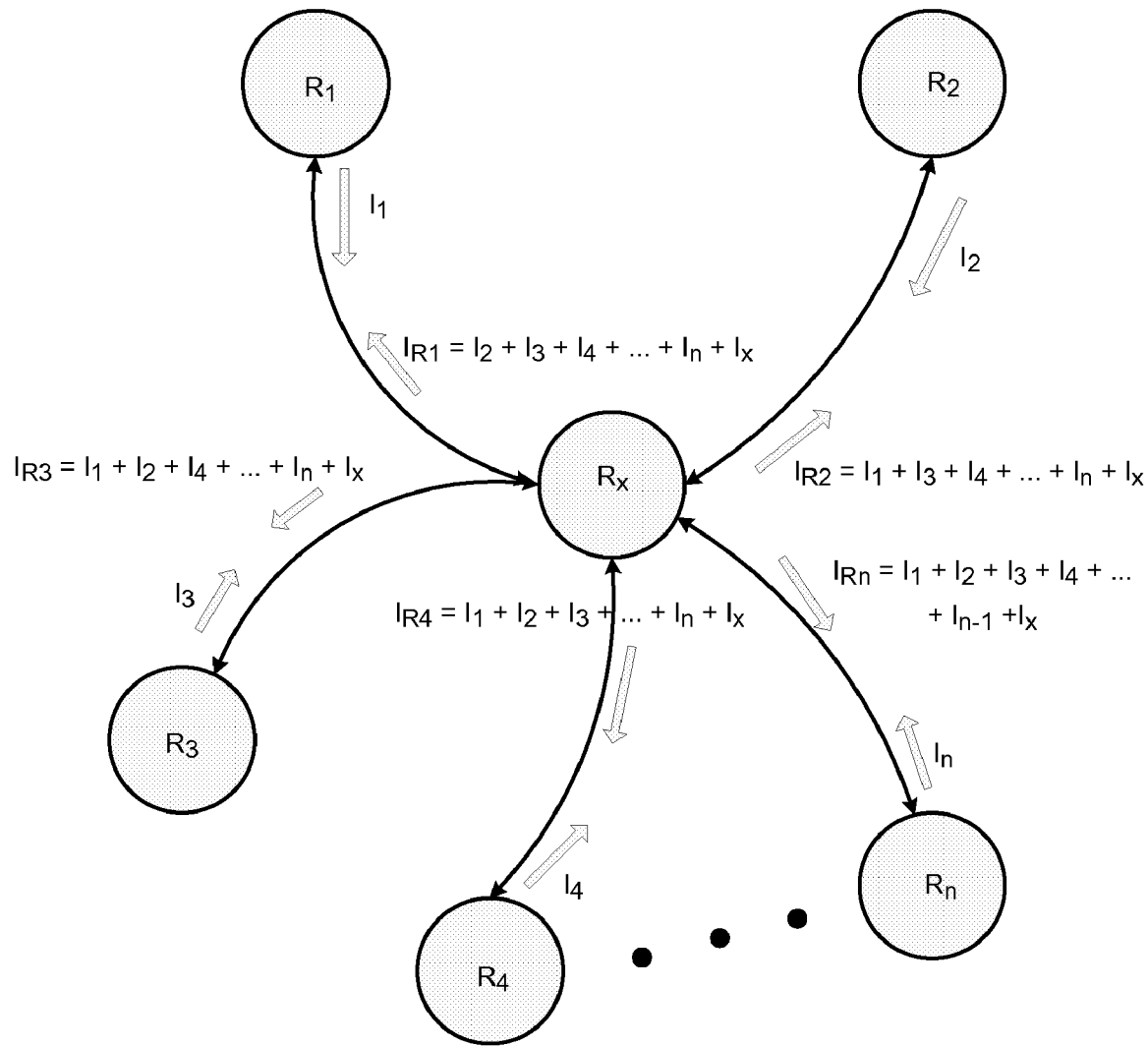
FIG. 3D is a diagram of the system for maintaining current differential protection during a bypass or similar operation for a power line having a plurality of IEDs associated therewith in accordance with an embodiment of the present invention.

As illustrated in FIG. 3D, transfer current differential relay $R_x$ may be adapted to preserve current differential protection active during a bypass or similar operation for a plurality of relays $R_1$, $R_2$, $R_3$, $R_4$, $R_n$ associated with a power line. The equations of this figure represent the vector sum of measured current at which each current differential relay operates under a normal condition wherein no fault or other abnormal condition exists on the power line. For example, current differential relay $R_4$ detects a normal condition when $I_{R4}=\Sigma(I_x, I_1, I_2, I_3, \ldots I_n)$, whereas a fault condition or an abnormal condition is detected when $I_{R4} \neq \Sigma(I_x, I_1, I_2, I_3, \ldots I_n)$. Upon detection of a fault, current differential relay $R_4$ may be adapted to send a trip signal to an associated circuit breaker to isolate the condition.

In the embodiments of the present invention as illustrated in FIGS. 2A-3D, the transfer current differential relay $R_x$ is the only affected relay which requires modification of settings contained therein; therefore, this present invention system and method is flexible and may be readily implemented throughout the power system.

Figure 3E:
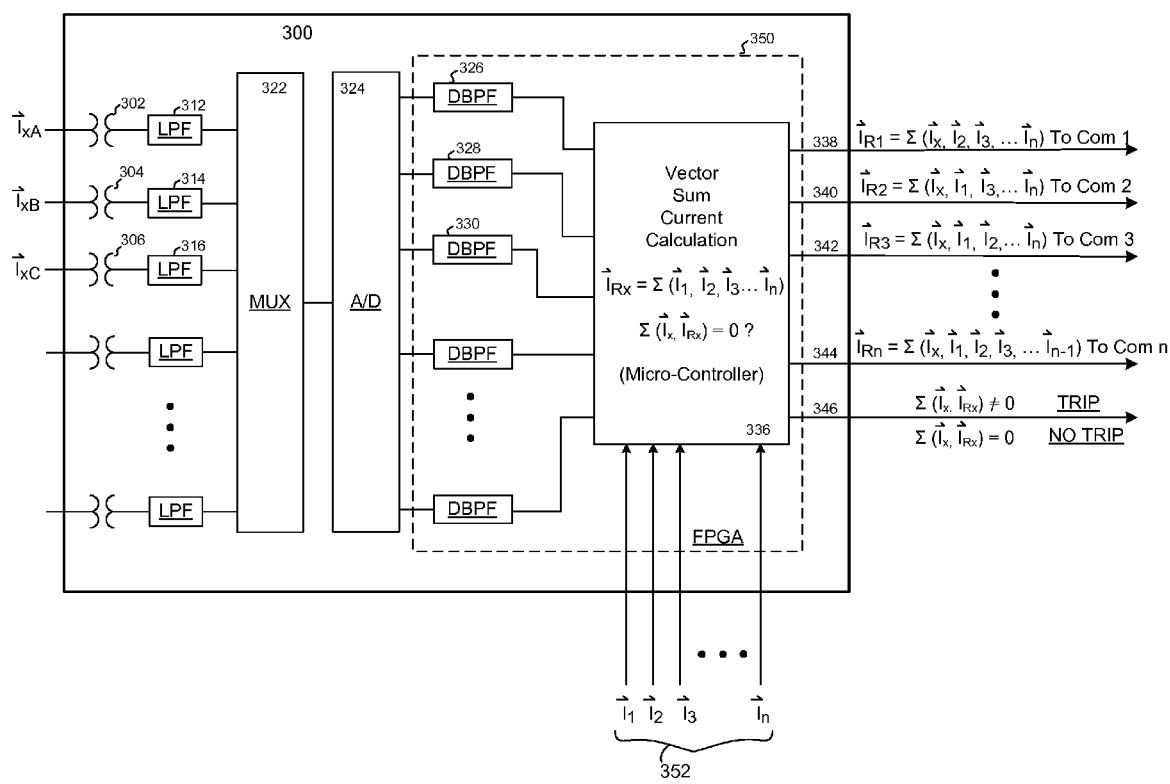
FIG. 3E is a block diagram of an IED for a system for maintaining current differential protection during a bypass or similar operation for a power line having a plurality of IEDs associated therewith in accordance with an embodiment of the present invention.

In accordance with an aspect of the present invention, FIG. 3E illustrates a block diagram of an IED 300 for preserving current differential protection active for a plurality of current differential relays $R_1$ to $R_n$ during a bypass or similar operation. This IED 300 may be utilized for transfer current differential relay $R_x$ functionality in the embodiments of the invention as described above.

In one embodiment, IED 300 measures the transfer current $I_x$ including any or all three phases of the current $I_{xA}$, $I_{xB}$, $I_{xC}$. Simultaneously, IED 300 is adapted to receive input data 352 from a plurality of serial inputs carrying digitized vector current quantities $I_1$ to $I_n$ (and any or all three phases thereof) measured and communicated by respective current differential relays $R_1$ to $R_n$ (not shown in this figure). This input data may be transmitted over a plurality of communications links (e.g., if connected directly to the relays or a communications switch) or a single communication link (e.g., if connected to a MUX).

The measured analog transfer current vector quantities $I_{xA}$, $I_{xB}$, $I_{xC}$ may be filtered using low pass filters 312, 314 316; optionally multiplexed through MUX 322; and digitized through an analog to digital (A/D) converter 324. The resulting digitized current values may further be respectively filtered through digital band pass filters 326, 328, 330 to further reduce noise.

A micro-controller 336 is provided to calculate a vector sum of the transfer current quantities $I_{xA}$, $I_{xB}$, $I_{xC}$ and the measured currents $I_1$, $I_2$, $I_3$ . . . $I_n$ received from current differential relays [$\Sigma(I_1, I_2, I_3 \ldots I_x)$]. Under normal conditions, the resulting vector sum equals about zero; therefore, an optional no trip signal is communicated at communication port 346 which may be connected to an associated circuit breaker. In contrast, if a fault or abnormal condition is detected, the resulting vector sum does not equal about zero; therefore, a trip signal is communicated at communication port 344 which may be connected to an associated circuit breaker.

Simultaneously, transfer current differential relay $R_x$ further calculates a vector sum of the currents for each current differential relay, wherein $I_{R1}=\Sigma(I_x, I_2, I_3, \ldots I_n)$; $I_{R2}=\Sigma(I_x, I_1, I_3, \ldots I_n)$ and $I_{R3}=\Sigma(I_x, I_1, I_2, \ldots I_n)$. The transfer current differential relay $R_x$ is adapted to transmit these values to corresponding current differential relays via communication ports 338, 340, 342. Each current differential relay determines whether a normal or an abnormal condition exists on the power line. For example, a normal condition is detected when $I_{R3}=\Sigma(I_x, I_1, I_2, \ldots I_n)$, whereas a fault condition or an abnormal condition is detected when $I_{R3} \neq \Sigma(I_x, I_1, I_2, \ldots I_n)$. As discussed above, upon detection of a fault, current differential relay $R_3$ may be adapted to send a trip signal to an associated circuit breaker to isolate the condition.

In an alternate embodiment of IED 300, the input data 352 may interface with a field programmable gate array (FPGA) 350 or an equivalent programmable logic device. The FPGA may be adapted to provide a data interface which includes DBPF 326, 328, 330 and micro-controller 336. As the system becomes more complex, one or more FPGAs with multiple microcontrollers may be included to perform other specific protection, monitoring, controlling, metering and/or automating functions.

Figure 3F:
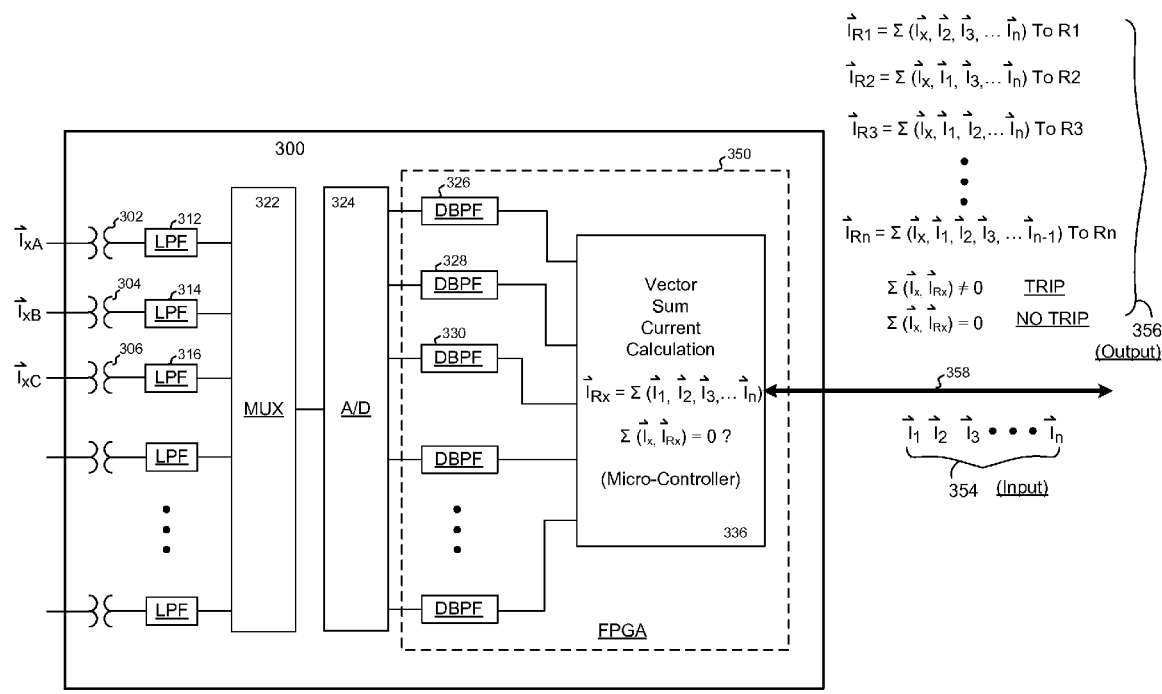
FIG. 3F is a block diagram of an IED for a system for maintaining current differential protection during a bypass or similar operation for a power line having a plurality of IEDs associated therewith in accordance with an embodiment of the present invention.

As illustrated in FIG. 3F, in yet another embodiment of IED 300, the communication ports 338, 340, 342, 344, and 346 of FIG. 3E may be replaced with a single communications link 358. An example of a suitable communication link is a network communication link 358 such as an Ethernet wide area network (not shown). The communication link 358 may be adapted such that multiple data frames may be sent and received through the same link 358. The IEC 61850 standard communication protocol is an example of a suitable protocol for fast communications between IEDS. In the embodiment of FIG. 3F, the communication link 358 may further be adapted to communicate the digitized current vector quantities $I_1, I_2, I_3 \ldots I_n$ measured and transmitted by their respective relays.

Figure 4A:
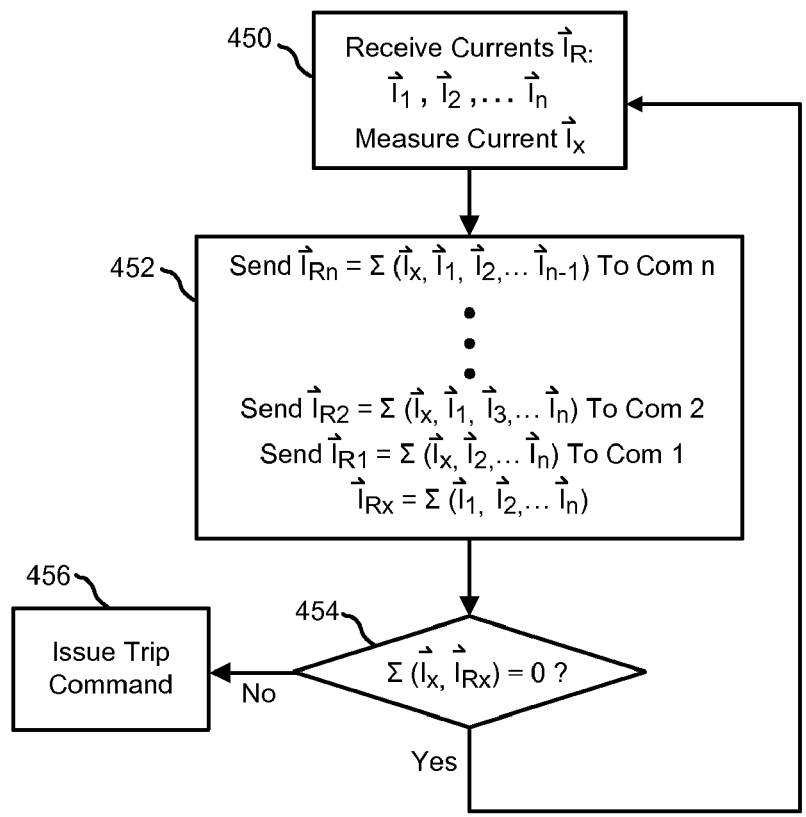
FIG. 4A is a flow chart depicting a method for maintaining current differential protection by a transfer relay during a bypass or similar operation for a power line having a plurality of IEDs associated therewith in accordance with an embodiment of the present invention.

In accordance with an aspect of the present invention, FIG. 4A illustrates a method wherein a transfer current differential relay $R_x$ communicates with each of the plurality of current differential relays $R_1, R_2 \ldots R_n$ in order to preserve current differential protection of an associated power line. In step 450, a transfer current differential relay $R_x$ receives current vector quantities $I_1, I_2 \ldots I_n$ from associated relays through a suitable communication link(s). Preferably, the current vector quantities transmitted to the transfer current differential relay $R_x$ are time-aligned in order to maintain power system synchronization. Concurrently, the transfer current differential relay $R_x$ measures its local current vector quantity $I_x$ through its current transformer. It is to be noted that the transfer current differential relay $R_x$ may be adapted to measure any or all three phases of the current $I_x$.

In step 452, the transfer current differential relay $R_x$ is adapted to calculate the vector sum of calculate a vector sum of the transfer current value $I_x$ and the measured currents $I_1, I_2, \ldots I_n$ received from current differential relays $[\Sigma(I_1, I_2, \ldots I_x)]$. Simultaneously, transfer current differential relay $R_x$ further calculates a vector sum of the currents for each current differential relay, wherein $I_{R1}=\Sigma(I_x, I_2, \ldots I_n)$; $I_{R2}=\Sigma(I_x, I_1 \ldots I_n)$ and $I_{Rn}=\Sigma(I_x, I_1, I_2, \ldots I_{n-1})$. The transfer current differential relay $R_x$ is adapted to transmit these values to corresponding relays via a suitable communication port Com 1, Com 2 . . . Com n, respectively.

In step 454, the transfer current differential relay $R_x$ determines whether the vector sum of transfer current value $I_x$ and the measured currents $I_1, I_2, \ldots I_n$ received from relays $[\Sigma(I_1, I_2 \ldots I_x)]$ equals about zero amperes. Under normal conditions, the resulting vector sum equals about zero amperes. Therefore, in such cases, the method is reestablished in order to monitor fault conditions on the associated line. In contrast, if a fault or abnormal condition is detected, the resulting vector sum does not equal about zero; therefore, a trip command is communicated as shown at 456 which may be communicated to an associated circuit breaker.

Figure 4B:
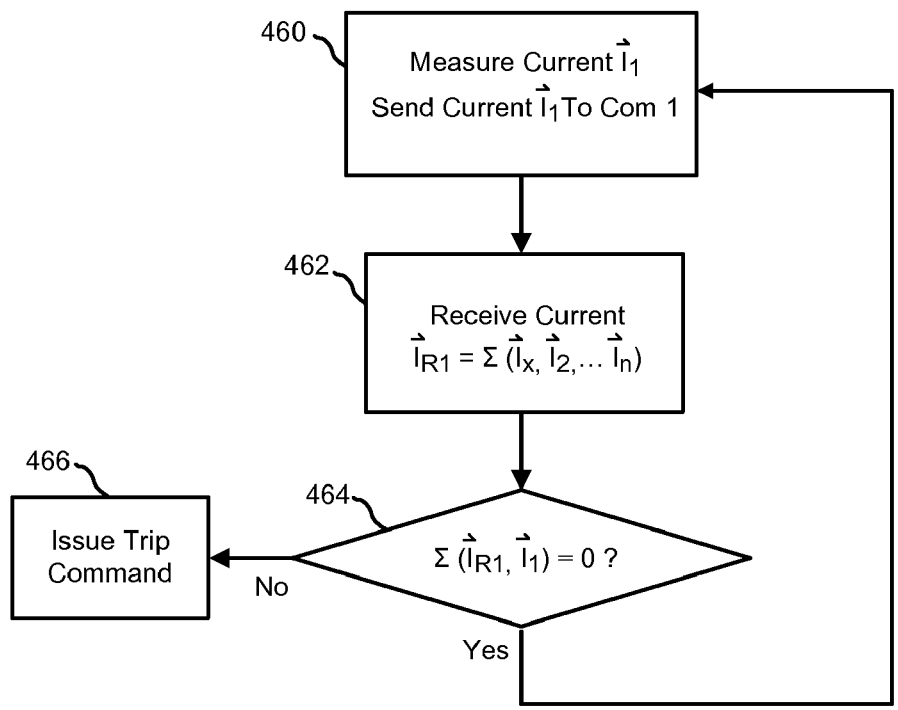
FIG. 4B is a flow chart depicting a method for maintaining current differential protection by an IED associated with the transfer relay of FIG. 4A during a bypass or similar operation for a power line having a plurality of IEDs associated therewith in accordance with an embodiment of the present invention.

In accordance with yet another aspect of the present invention, FIG. 4B illustrates a method wherein a current differential relay $R_1$ associated with the transfer current differential relay $R_x$ of FIG. 4A communicates with such in order to preserve current differential protection of an associated power line. In step 460, current differential relay $R_1$ measures its local current vector quantity $I_1$ through its current transformer. Concurrently, this current vector quantity $I_1$ is transmitted to transfer current differential relay $R_x$.

In step 462, current differential relay $R_1$ receives the vector sum of currents $I_{R1}$ transmitted from transfer current differential relay $R_x$ ($I_{R1}=\Sigma(I_x, I_2, \ldots I_n)$), the calculation of which is explained in detail above with respect to FIG. 4A.

In step 464, the transfer current differential relay $R_x$ determines whether the vector sum of the measured current value $I_1$ and vector sum of currents $I_{R1}$ equals about zero amperes. Under normal conditions, the resulting vector sum equals about zero amperes. Therefore, in such cases, the method is reestablished in order to monitor fault conditions on the associated line. In contrast, if a fault or abnormal condition is detected, the resulting vector sum does not equal about zero; therefore, a trip command is communicated as shown at 466 which may be communicated to an associated circuit breaker.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A system for providing protection of a power line using a plurality of intelligent electronic devices (IEDs), comprising:

a local IED associated with a location of the power line, the local IED adapted to measure and transmit the current associated with the location of the local IED, a remote IED associated with a location of the power line, the remote IED adapted to measure and transmit the current associated with the location of the remote IED, a transfer IED in communication with the local and remote IEDs and adapted to receive the currents transmitted by the local and remote IEDs, said transfer IED further associated with a location of a second power line interconnected with the first power line, wherein said transfer IED calculates the sum of the currents associated with the location of the second power line and the currents received from the local and remote IEDs, a circuit breaker associated with the second power line, said circuit breaker adapted to isolate a location on the second power line, wherein the transfer IED is adapted to transmit the current measured by the transfer IED and the current measured by one of the remote IED and the local IED to the other of the remote IED and the local IED, and wherein when the sum of the currents is not equal to about zero amperes, the transfer IED transmits a signal to cause tripping of the circuit breaker, thereby isolating the location of the second power line associated with the transfer IED.

2. The system of claim 1, wherein the first power line is parallel to the second power line.

3. The system of claim 1, wherein the circuit breaker is further associated with the local or remote IED.

4. The system of claim 1, further comprising a circuit breaker associated with the first power line associated with either the local or remote IED for providing primary protection thereof, wherein the circuit breaker associated with the second power line provides for secondary protection of the first power line.

5. The system of claim 1, wherein the transfer IED is in communication with the local and remote IEDs via a bidirectional communications link.

6. The system of claim 1, wherein the local IED is a current differential IED.

7. The system of claim 1, wherein the transfer IED is a current differential IED.

8. They system of claim 1, wherein the remote IED is a current differential IED.

9. The system of claim 1, wherein the local IED is adapted to receive the current measured by the transfer IED and the current measured by the remote IED, said local IED adapted to communicate a signal to cause tripping of an associated circuit breaker if the current measured by the local IED does not equal the currents received from the transfer IED.

10. The system of claim 1, wherein the remote IED is adapted to receive the current measured by the transfer IED and the current measured by the local IED, said remote IED adapted to communicate a signal to cause tripping of an associated circuit breaker if the current measured by the remote IED does not equal the currents received from the transfer IED.

11. The system of claim 1, further including a communications switch for coordinating communications among the IEDs.

12. The system of claim 11, further including a multiplexer for controlling the communications switch.

13. The system of claim 1, further including a multiplexer for coordinating communications among the IEDs.

14. The system of claim 1, wherein the communication among the IEDs is encrypted.

15. A transfer IED for protection of a power line in a power system including a local IED associated with a location of the power line, the local IED adapted to measure and transmit the current associated with the location of the local IED, and a remote IED associated with a location of the power line, the remote IED adapted to measure and transmit the current associated with the location of the remote IED, said transfer IED comprising:
a micro-controller in communication with the local and remote IEDs and adapted to receive the currents transmitted by the local and remote IEDs, said micro-controller further associated with a location of a second power line interconnected with the first power line, wherein said micro-controller calculates the sum of the currents associated with a location of the second power line and the currents received from the local and remote IEDs, and wherein when the sum of the currents is not equal to about zero amperes, the micro-controller transmits a signal to cause tripping of a circuit breaker associated with the second power line, thereby isolating the location of the second power line associated with the transfer IED, and
wherein the micro-controller is adapted to communicate the currents associated with the location of the second power line and one of the currents received from the local IED and the currents received from the remote IED to the other one of the local IED and the remote IED.

16. The apparatus of claim 15, wherein the first power line is parallel to the second power line.

17. The apparatus of claim 15, wherein the circuit breaker is further associated with the local or remote IED.

18. The apparatus of claim 15, wherein the circuit breaker associated with the second power line provides for secondary protection of the first power line.

19. The apparatus of claim 15, wherein the micro-controller is in communication with the local and remote IEDs via a bidirectional communications link.

20. The apparatus of claim 15, wherein the local IED is a current differential IED.

21. The apparatus of claim 15, wherein the remote IED is a current differential IED.

22. They apparatus of claim 15, wherein the transfer IED is a current differential IED.

23. The apparatus of claim 15, wherein the micro-controller is further adapted to transmit the current measured by the transfer IED and the current measured by the remote IED to the local IED.

24. The apparatus of claim 15, wherein the transfer IED is adapted to transmit the current measured by the transfer IED and the current measured by the local IED to the remote IED.

25. The apparatus of claim 15, further including a communications switch for coordinating communications among the IEDs.

26. The apparatus of claim 25, further including a multiplexer for controlling the communications switch.

27. The apparatus of claim 15, further including a multiplexer for coordinating communications among the IEDs.

28. A method for protection of a power line in a power system, including the steps of:
measuring the current associated with a first location of a first power line,
measuring the current associated with a second location of the first power line,
measuring the current associated with a location of a second power line interconnected with the first power line,
calculating the sum of the currents associated with the locations of the first and second power lines,
transmitting the current associated with the first location of the first power line, the current associated with a second location of the first power line, and the current associated with the location of the second power line to a relay configured to measure the current associated with the first location of the first power line or a relay configured to measure the current associated with the second location of the first power line, and
transmitting a signal to a circuit breaker associated with the second power line when the sum of the currents is not equal to about zero amperes.

29. The method of claim 28, wherein the circuit breaker is associated with a current differential IED.

30. The method of claim 28, wherein the circuit breaker is associated with a local or remote IED.

31. The method of claim 28, wherein the circuit breaker associated with the second power line provides for secondary protection of the first power line.

32. The method of claim 28, wherein the current at the first location of the first power line is measured by a local IED.

33. The method of claim 28, wherein the current at the second location of the first power line is measured by a remote IED.

34. The method of claim 32, further comprising the step of transmitting the current at the second location of the first power line and the current at the location of the second power line to the local IED.

35. The method of claim 33, further comprising the step of transmitting the current at the first location of the first power line and the current at the location of the second power line to the remote IED.

36. A method for maintaining protection of a power line in a power system, including the steps of:
measuring the current associated with a first location of a first power line,
measuring the current associated with a second location of the first power line,
measuring the current associated with a location of a second power line interconnected with the first power line, communicating the current associated with the first location of the first power line, the current associated with a second location of the first power line, and the current associated with the location of the second power line to a relay configured to measure the current associated with the first location of the first power line or a relay configured to measure the current associated with the second location of the first power line, calculating the sum of the current associated with the first location of the first power line and current associated with the location of the second power line, and transmitting a signal to a circuit breaker associated with the location of the second power line when the sum of the currents is not equal to about the current associated with the second location of the first power line.

37. The method of claim 36, wherein the circuit breaker provides for primary protection of the first power line.

38. The method of claim 36, wherein the current associated with the first location of the first power line is measured by a remote relay.

39. The method of claim 36, wherein the current associated with the first location of the first power line is measured by a local relay.

40. A system for preserving current differential protection of a power line during a bypass operation using a plurality of intelligent electronic devices (IEDs), comprising:

a local current differential IED associated with a location of a first power line, the local IED adapted to measure and transmit the current associated with the location of the local IED, a remote current differential IED associated with a location of the first power line, the remote IED adapted to measure and transmit the current associated with the location of the remote IED, a transfer current differential IED associated with a location of a second power line in parallel with the first power line, the transfer IED adapted to measure and transmit the current associated with the location of the transfer IED, a circuit breaker associated with each of said IEDs, said circuit breakers adapted to isolate a location on its associated power line, wherein said transfer IED is in communication with the local and remote IEDs and adapted to receive the currents transmitted by the local and remote IEDs, said transfer IED further adapted to calculate the sum of the currents associated with the location of the second power line and the currents received from the local and remote IEDs, wherein when the sum of the currents associated with the location of the second power line and the currents received from the local and remote IEDs is not equal to about zero amperes, the transfer IED transmits a signal to cause tripping of its associated circuit breaker, thereby isolating the location of the second power line associated with the transfer current differential IED, the transfer IED further adapted to communicate the current measured by the transfer IED and the current measured by the remote IED to the local IED, and to communicate the current measured by the transfer IED and the current measured by the local IED to the remote IED, wherein the local IED is adapted to receive the current measured by the transfer IED and the current measured by the remote IED, said local IED adapted to communicate a signal to cause tripping of its associated circuit breaker if the current measured by the local IED does not equal the currents received from the transfer IED, and wherein the remote IED is adapted to receive the current measured by the transfer IED and the current measured by the local IED, said remote IED adapted to communicate a signal to cause tripping of its associated circuit breaker if the current measured by the remote IED does not equal the currents received from the transfer IED such that tripping of all circuit breakers isolates a fault condition on either the first or second power line.

41. The system of claim 40, wherein the transfer IED is in communication with the local and remote IEDs via a bidirectional communications link.

42. The system of claim 40, further including a communications switch for coordinating communications among the IEDs.

43. The system of claim 42, further including a multiplexer for controlling the communications switch.

44. The system of claim 40, further including a multiplexer for coordinating communications among the IEDs.

* * * * *